(12) United States Patent
Meador

(10) Patent No.: US 11,554,628 B2
(45) Date of Patent: Jan. 17, 2023

(54) TEMPERATURE REGULATION FOR AUTONOMOUS VEHICLE DELIVERY

(71) Applicant: GM Cruise Holdings LLC, San Francisco, CA (US)

(72) Inventor: Timothy Jon Meador, Fairfield, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 514 days.

(21) Appl. No.: 16/719,730

(22) Filed: Dec. 18, 2019

(65) Prior Publication Data

US 2021/0188034 A1   Jun. 24, 2021

(51) Int. Cl.
  *B60H 1/00*   (2006.01)
  *G05D 1/02*   (2020.01)
  *G06Q 10/08*  (2012.01)

(52) U.S. Cl.
  CPC ....... *B60H 1/00014* (2013.01); *G05D 1/0293* (2013.01); *G06Q 10/0832* (2013.01)

(58) Field of Classification Search
  CPC ............. B60H 1/00014; G05D 1/0293; G06Q 10/0832
  See application file for complete search history.

(56) References Cited

U.S. PATENT DOCUMENTS

| 10,245,993 | B1* | 4/2019 | Brady | B60H 1/00771 |
| 2007/0008119 | A1* | 1/2007 | Pohle | H04L 67/04 374/E1.004 |
| 2018/0226328 | A1* | 8/2018 | Rodriguez | H01L 23/145 |
| 2019/0072293 | A1* | 3/2019 | Kim | H04M 1/72412 |

* cited by examiner

*Primary Examiner* — Schyler S Sanks
(74) *Attorney, Agent, or Firm* — Akona IP PC

(57) ABSTRACT

Systems and methods are provided for temperature regulation in an autonomous vehicle. In particular, systems and methods are provided for regulating the interior temperature of a delivery container in an autonomous vehicle. In various implementations, the delivery container includes one or more compartments, and a thermal management system is provided for regulating the temperature of each of the compartments.

20 Claims, 7 Drawing Sheets

TEMPERATURE REGULATION FOR AUTONOMOUS VEHICLE DELIVERY

FIELD OF THE DISCLOSURE

The present disclosure relates generally to autonomous vehicles (AVs) and to systems and methods for autonomous vehicle delivery of goods.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

SUMMARY

Systems and methods are provided for temperature regulation in an autonomous vehicle. In particular, systems and methods are provided for regulating the interior temperature of a delivery container inside an autonomous vehicle. In various implementations, the delivery container includes one or more compartments, and a thermal management system is provided for regulating the temperature of each of the one or more compartments.

According to one aspect, a method for regulating temperature in for autonomous vehicle delivery includes receiving a delivery request including a selected temperature, selecting an autonomous vehicle to fulfill the delivery request, wherein the autonomous vehicle has a delivery container, directing the selected autonomous vehicle to a pick-up location, adjusting a delivery container temperature to correspond to the selected temperature, and transporting a package in the delivery container to a drop off location.

According to some implementations, the method further includes monitoring the delivery container temperature. In some examples, a thermal management system monitors the delivery container temperature. According to some examples, monitoring the delivery container temperature includes continuously monitoring the delivery container temperature. According to some examples, monitoring the delivery container temperature includes periodically monitoring the delivery container temperature.

In some implementations, the method includes determining whether the delivery container temperature corresponds to the selected temperature and outputting a determination. In some examples, the method includes adjusting a delivery container temperature is based at least in part on the determination.

In some implementations, the selected temperature includes a temperature range. In some examples, the selected temperature and/or the temperature range is represented to a user by a descriptive word.

In some implementations, adjusting the delivery container temperature includes one of heating the delivery container and cooling the delivery container. In some implementations, adjusting the delivery container temperature includes receiving an input from an HVAC system. In some implementations, adjusting the delivery container temperature includes increasing the delivery container temperature by utilizing heat generated by at least one of an onboard computer and a battery. In some implementations, adjusting the delivery container temperature includes utilizing an external environment temperature and inputting the external environment temperature to the delivery container. In some examples, the external environment includes air inside the autonomous vehicle. In some examples, the external environment includes air outside the autonomous vehicle.

In some implementations, the delivery container includes a first compartment and a second compartment, and where adjusting the delivery container temperature includes: adjusting a first temperature of the first compartment, and adjusting a second temperature of the second compartment. In various examples, the first temperature is different from the second temperature.

According to one aspect, a system for autonomous vehicle delivery includes a plurality of autonomous vehicles each having a respective delivery container and a remote computing system. The remote computing system is configured to receive a package delivery request including a selected temperature, select an autonomous vehicle from the plurality of autonomous vehicles to fulfill the package delivery request, and direct the selected autonomous vehicle to a pick-up location. Each of the plurality of autonomous vehicles is configured to adjust a delivery container temperature of the respective delivery container to correspond to the selected temperature, and transport a package in the respective delivery container to a drop off location.

In some implementations, the respective delivery container includes a first compartment and a second compartment, and wherein each of the plurality of autonomous vehicles is configured to adjust the delivery container temperature by adjusting a first temperature of the first compartment, and adjusting a second temperature of the second compartment.

In some implementations, each of the plurality of autonomous vehicles includes a thermal management system, and wherein the thermal management system adjusts the delivery container temperature.

In some implementations, the thermal management system uses thermal energy from one of a battery, an onboard computer, and an external environment to adjust the delivery container temperature.

According to one aspect, a vehicle for delivering packages includes a delivery container, wherein an inside of the delivery container is temperature regulated, a processor for receiving a routing instruction including a selected temperature for the delivery container and monitoring a delivery container temperature, and a thermal management system for adjusting the delivery container temperature.

In some implementations, the thermal management system further manages a battery temperature and an onboard computer temperature.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Figure 1:
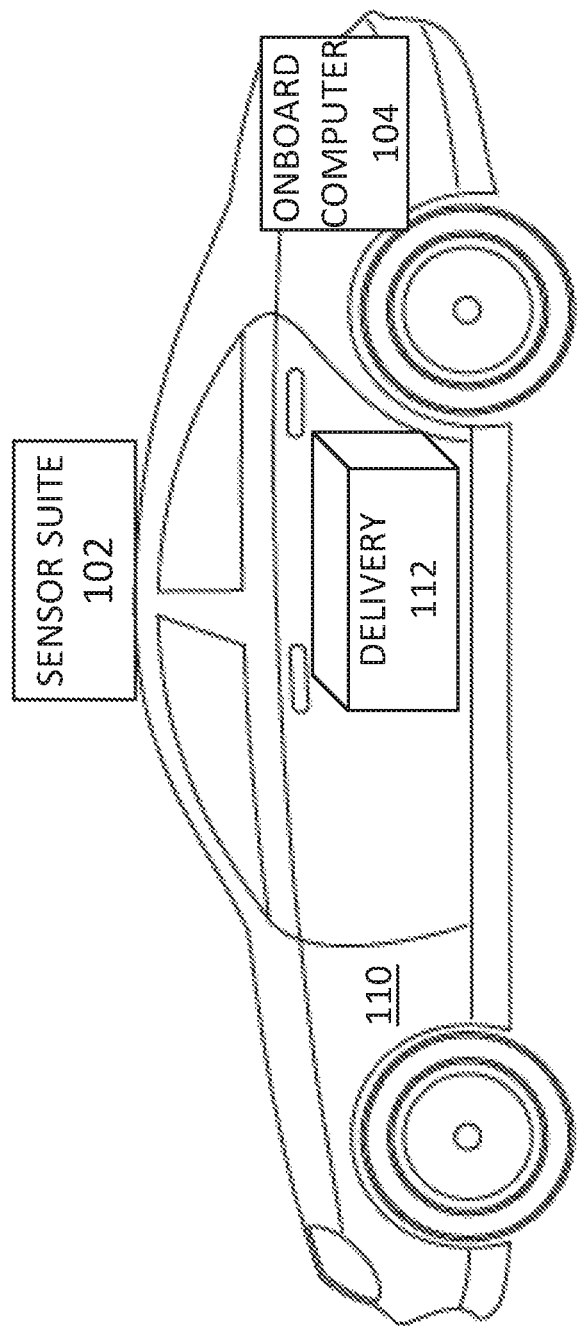
FIG. 1 is a diagram illustrating an autonomous vehicle, according to some embodiments of the disclosure.

Systems and methods are provided for temperature regulation in an autonomous vehicle. In particular, systems and methods are provided for regulating the interior temperature of an autonomous vehicle. In various implementations, one or more compartments is included inside an autonomous vehicle, and systems and methods are provided for regulating the temperature of each of the one or more compartments. In various implementations, the container inside the autonomous vehicle is used in a peer-to-peer delivery system.

In various implementations, the compartment inside the autonomous vehicle is used for delivering goods. The goods placed in the compartment, to be delivered by the autonomous vehicle, may benefit from cooling or heating. For example, food deliveries benefit from temperature regulation—some food deliveries may benefit from staying warm, while other food deliveries may benefit from staying cold. In some implementations, passive cooling of the compartment is provided using a cooling source inside or outside the AV. Some cooling sources include the HVAC system of the AV, and, potentially, outside air. In some implementations, passive heating of the compartment is provided using heat sources inside or outside the AV. Some heating sources include the AV computer, the AV battery, the HVAC system of the AV, and, potentially, outside air. Passive cooling and heating of the delivery using cool and hot sources in or outside of the AV improves the energy efficiency of the AV as compared to having a dedicated heating or cooling unit for the compartment.

In various implementations, sensors are used to monitor the temperature of the compartment(s). In some examples, sensor data in the compartment is used as inputs to cooling and/or heating systems, to regulate the temperature in the compartment. In some examples, sensor data in the compartment is used as feedback to cooling and/or heating systems to help regulate temperature in the compartment.

In some implementations, a removable box is positioned in the back seat. In various examples, the box includes multiple compartments. In some examples, the box includes mobile dividers that can be used to customize the size of one or more compartments inside the box. Each compartment in the box can be set to a unique temperature. In one example, the box includes one compartment set to cool and a second compartment set to heat.

In some implementations, systems and methods are provided for temperature regulation of the interior of the vehicle for passengers. For example, as discussed above, the heat generated by the AV computer can be used to heat the passenger area of the vehicle.

In various implementations, the AV can be converted from passenger use to cargo/delivery use and back again. The temperature regulation system is designed to function in both the cargo/delivery mode and the passenger mode.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

FIG. 1 is a diagram 100 illustrating an autonomous vehicle 110, according to some embodiments of the disclosure. The autonomous vehicle 110 includes a sensor suite 102, an onboard computer 104, and a delivery container 112. In various examples, package and/or goods are placed in the delivery container for delivery by the autonomous vehicle 110. In various implementations, the autonomous vehicle 110 uses sensor information from the sensor suite 102 to determine its location, to navigate traffic, and to sense and avoid various obstacles.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. Based upon the vehicle state and programmed instructions, the onboard computer 104 controls and/or modifies driving behavior of the autonomous vehicle 110.

According to some implementations, the onboard computer 104 generates a significant amount of heat. The heat from the onboard computer 104 can be used to heat the delivery container 112, any other cargo compartment, and/or a passenger area.

The onboard computer 104 functions to control the operations and functionality of the autonomous vehicles 110 and processes sensed data from the sensor suite 102 and/or other sensors in order to determine states of the autonomous vehicles no. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Figure 2:
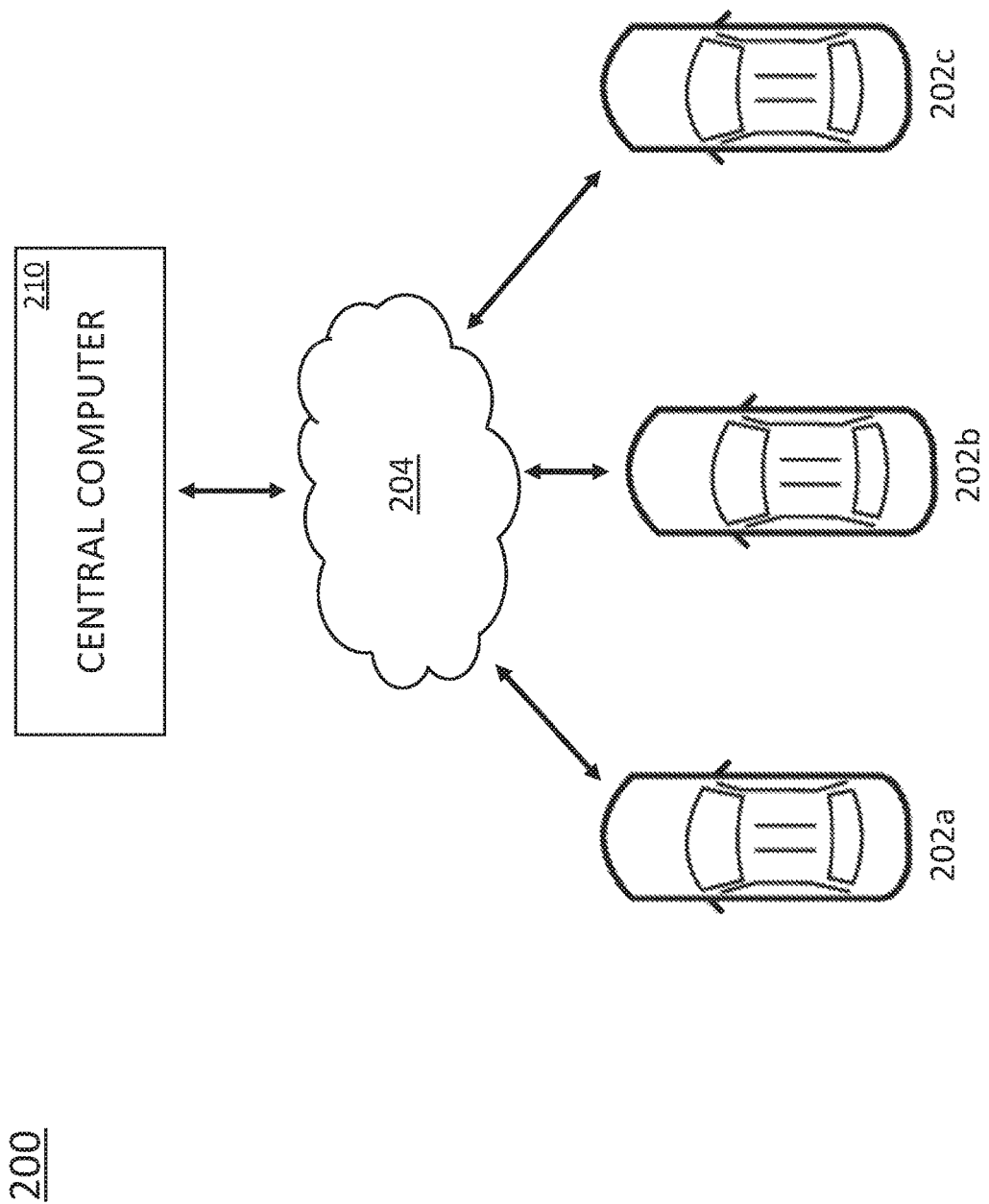
FIG. 2 is a diagram illustrating a fleet of vehicles in communication with a central computer, according to some embodiments of the disclosure.

FIG. 2 is a diagram 200 illustrating a fleet of vehicles 202a, 202b, 202c in communication with a central computer 210, according to some embodiments of the disclosure. As shown in FIG. 2, the vehicles 202a, 202b, 202c communicate wirelessly to a cloud 204 and a central computer 210. The central computer 210 includes a database of information from the vehicles in the fleet and a routing coordinator. Autonomous vehicle fleet routing refers to the routing of multiple vehicles in a fleet, and includes routing back to a service center for updates, repair, and maintenance.

Figure 3:
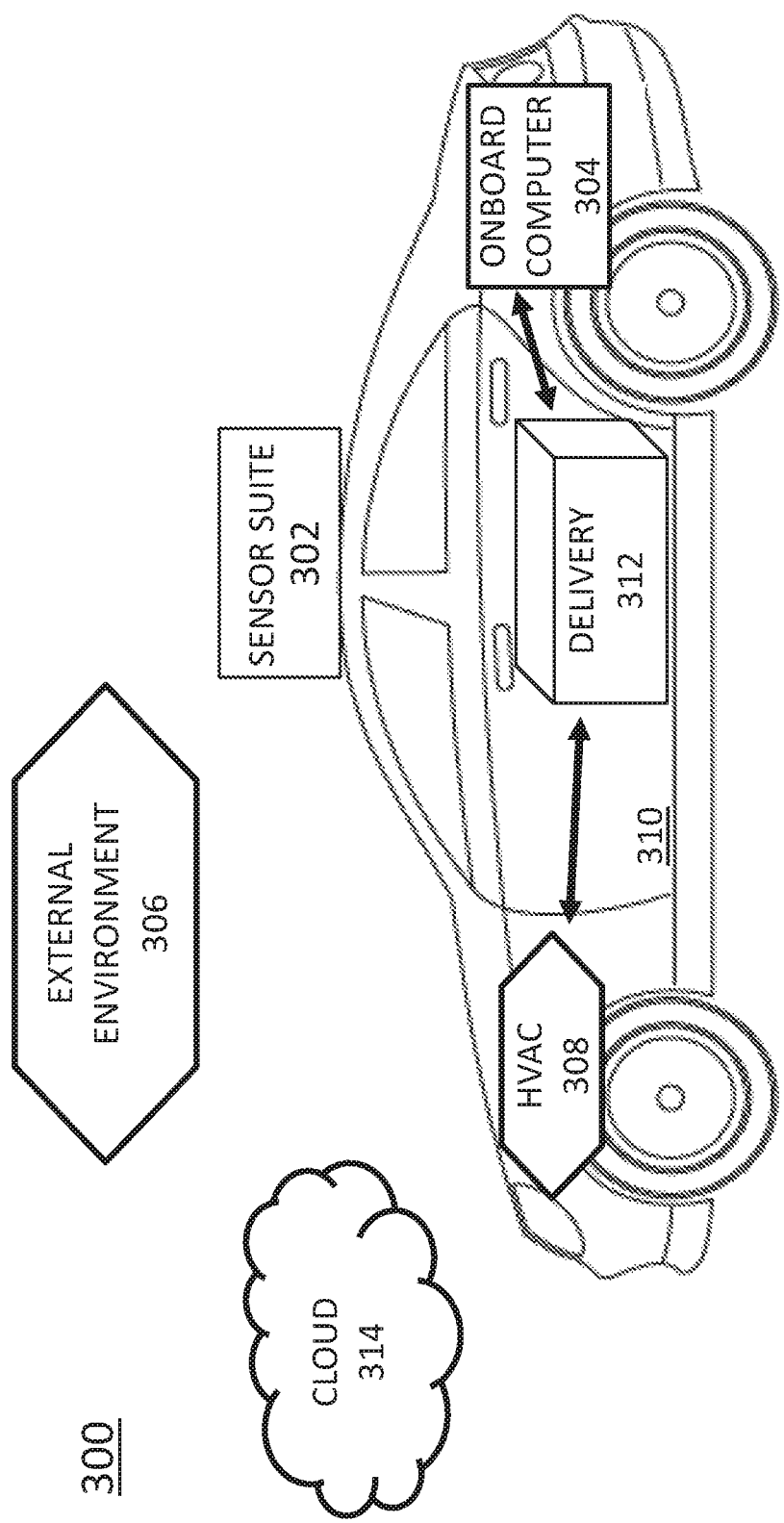
FIG. 3 is a diagram illustrating an autonomous vehicle having a delivery container, according to some embodiments of the disclosure.

FIG. 3 is a diagram 300 illustrating an autonomous vehicle 310 having a delivery container 312 and a heating, ventilation, and air conditioning (HVAC) system 308 according to some embodiments of the disclosure. As illustrated in FIG. 3, the HVAC system 308 is connected to the delivery container 312. In particular, the HVAC 308 can be used to heat or cool the delivery container 312. Additionally, the onboard computer 304 is connected to the delivery container 312. Heat from the onboard computer 304 can be used to heat the delivery container 312. Additionally, in some examples, the onboard computer 304 monitors the temperature of the delivery container 312. In some examples, the onboard computer 304 provides feedback regarding the temperature of the delivery container 312 to the HVAC 308, and the HVAC 308 adjusts the temperature of the delivery container 312.

In some implementations, the autonomous vehicle 312 includes a thermal management system. The thermal management system manages the temperature of the battery. In particular, the battery can become hot, and the thermal management system cools the battery. In some examples, the thermal management system manages the temperature of the onboard computer 304. The onboard computer 304 can also become hot, and the thermal management system cools the onboard computer 304.

In some implementations, the delivery container 312 includes a compartment configured to cook or bake foods. In one example, the delivery container 312 includes a sous vide compartment. At pick-up, a food item can be inserted into the sous vide compartment for sous vide cooking, and a timer is set for sous vide cooking of the food item. While the autonomous vehicle 310 is driving from the pick-up location to the drop-off location, the food item cooks in the delivery container 312 cooking compartment. At drop-off, the food item is ready, and the freshly cooked food item is delivered to the drop-off location.

Figure 4:
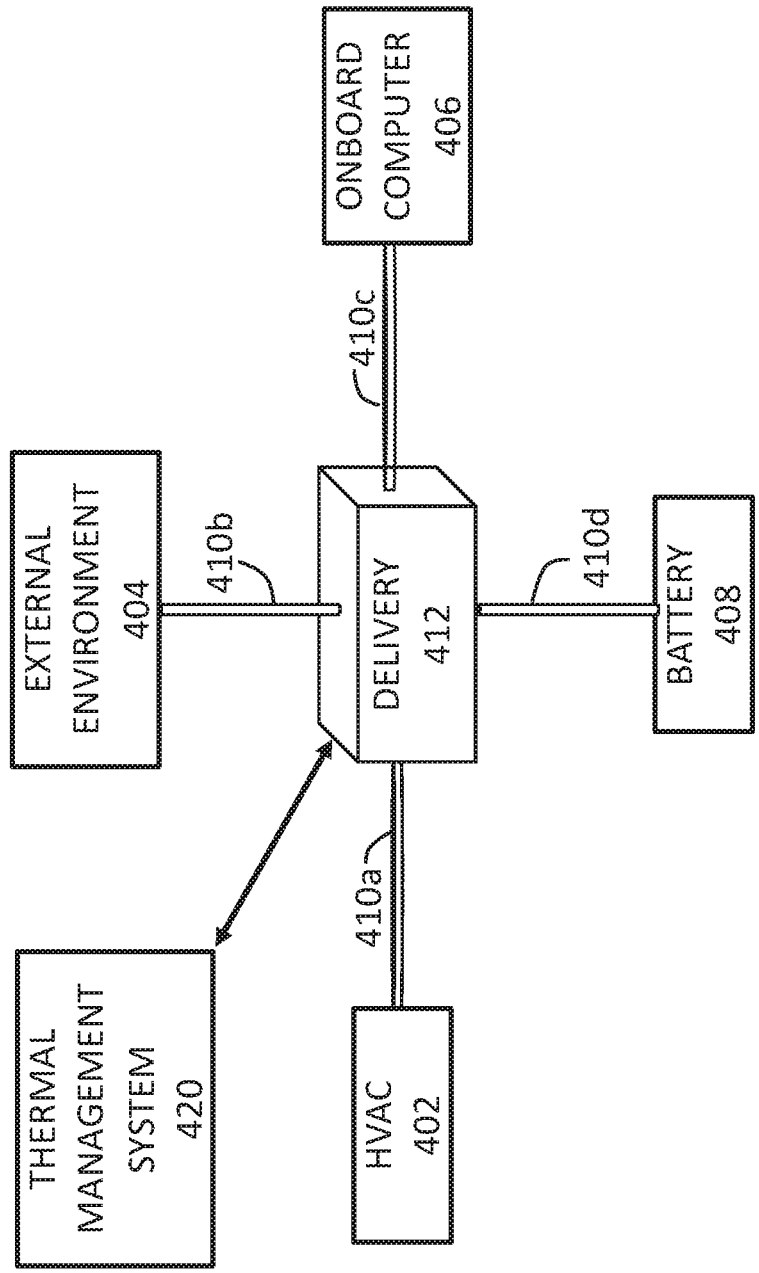
FIG. 4 is a diagram illustrating inputs to a delivery container, according to some embodiments of the disclosure.

FIG. 4 is a diagram 400 illustrating inputs to a delivery container 412, according to some embodiments of the disclosure. As shown in FIG. 4, the delivery container 412 has four inputs: an HVAC system 402, the external environment 404, an on board computer 406, and a battery 408. Additionally, the delivery container 412 is in communication with the thermal management system 420. Each of the inputs 402, 404, 406, 408 is connected to the delivery container 412 via an input line. A first input line 410a connects the HVAC system 402 to the delivery container 412. A second input line 410b connects the external environment 404 to the delivery container 412. A third input line 410c connects the onboard computer 406 to the delivery container 412. A fourth input line 410d connects the battery 408 to the delivery container 412.

According to some implementations, one or more of the first 410a, second 410b, third 410c, and fourth 410d input lines allow air or another gas to pass through to the delivery container 412. In some examples, one or more of the first 410a, second 410b, third 410c, and fourth 410d input lines input a gas (such as air) into the delivery container 412 that changes the temperature inside the delivery container.

The thermal management system 420 communicates with the delivery container 412 and manages the temperature of the delivery container 412. The thermal management system 420 monitors the temperature of the inside of the delivery container 412. In some implementations, the thermal management system 420 is also in communication with one or more of the HVAC system 402, the onboard computer 406, and the battery 408. The thermal management system 420 can adjust the temperature of the delivery container 412 using one or more of the HVAC system 402, the external environment 404, the on board computer 406, and the battery 408 as a heating or cooling source.

In one implementation, the thermal management system 420 monitors the temperature inside the delivery container 412 and in some examples, the thermal management system 420 sends instructions to change the temperature of inside the delivery container 412. In some examples, the thermal management system 420 causes the temperature inside of the delivery container 412 to increase. In some examples, the thermal management system 420 causes the temperature inside of the delivery container to decrease.

There are multiple possible implementations for changing the temperature inside the delivery container 412. Following are some implementations for heating the delivery container 412. In particular, in some examples, the HVAC 402 inputs hot air into the delivery container 412. In some examples, when the external environment 404 temperature is warmer than the target temperature for the delivery container 412, hot external air is input to the delivery container 412. In one example, external air includes air inside the autonomous vehicle. In one example, external air includes air outside the autonomous vehicle. The external environment 404 outside air temperature can be accessed by opening a window of the autonomous vehicle.

In some examples, heat generated by the onboard computer 408 heats air or another gas that is input to the delivery container 412 to increase the temperature of the delivery container 412. In some examples, heat generated by the onboard computer 408 is used to increase the temperature the delivery container 412 through thermal conduction to the delivery container 412. In some examples, heat generated by the battery 408 heats air or another gas that is input to the delivery container 412 to increase the temperature of the delivery container 412. In some examples, heat generated by the battery 408 is used to is used to increase the temperature of the delivery container 412 through thermal conduction to the delivery container 412.

In some implementations, the thermal management system 420 sends instructions to a delivery container 412 heating element. In various examples, the instructions include instructions to turn on the heating element and/or instructions to turn off the heating element. In some examples, the instructions include instructions to turn on and/or off a portion of the heating element. In one example, the heating element is an electric heating element. In some examples, the thermal management system 420 receives feedback information from the delivery container 412 including the temperature inside the delivery container 412. In some examples, the delivery container 412 includes multiple compartments, and the temperature of each compartment is independently monitored and adjusted.

In some implementations, the thermal management system 420 sends instructions that cause heat from another source to be transferred to the delivery container 412. In one example, the thermal management system 420 sends instructions that cause heat from the battery 408 to be transferred to the delivery container 412. Similarly, in some examples, the thermal management system 420 sends instructions that cause the HVAC 402 to heat or cool the delivery container 412. In some examples, the thermal management system 420 sends instructions that cause external environment 404 air to heat or cool the delivery container. In some examples, the thermal management system 420 sends instructions that cause heat from the onboard computer 406 to be transferred to the delivery container 412.

In some implementations, the thermal management system 420 is integrated into the onboard computer 406. In some implementations, the thermal management system 420 manages the temperature of the onboard computer 406. In some implementations, the thermal management system 420 manages the temperature of the battery 408.

In some implementations, a remote computer sends instructions for adjusting the temperature in the delivery container 412. The remote computer may send instructions for heat from one of the input sources shown in FIG. 4 to be transferred to the delivery container 412. The remote computer may send instructions for cool air from one of the input sources shown in FIG. 4 to be transferred to the delivery container 412.

As discussed above, in various implementations, heat is transferred from one or more of the HVAC system 402, the external environment 404, the on board computer 406, and the battery 408. One advantage of using one or more of the on board computer 406, and the battery 408 is that these elements generate heat and thus no further energy or power is expended in creating heat for the delivery container. Similarly, in some instances, the external environment 404 contains sufficient heat that no further energy or power is expended in creating heat for the delivery container. The heat generated by the elements can be transferred to the delivery container via one or thermal conduction, thermal convection, thermal radiation, and transfer of energy by phase changes.

Various heating system types can be integrated into the autonomous vehicle to heat the delivery container, and/or to heat a specific package. In one example, electric heating is used. Electric heating converts electrical energy to heat energy. The heating element is an electrical resistor, and current passing through the resistor converts the electrical energy into heat energy. In some examples, a nichrome wire is used as a heating element. In another example, a heat pump uses an electric motor to drive a refrigeration cycle that draws heat energy from another source and directs the heat into the delivery container. In one example, the source of the heat energy is one or more of the battery 408, the onboard computer 406, and the external environment 404. The external environment 404 heat can come from the outside air and/or from the ground.

As stated above, there are multiple possible implementations for changing the temperature inside the delivery container 412. Following are some implementations for cooling the delivery container. In particular, in some examples, the HVAC 402 inputs cold air into the delivery container 412. In some examples, when the external environment 404 temperature is colder than the target temperature for the delivery container 412, cold external air is input to the delivery container 412. In one example, external air includes air inside the autonomous vehicle. In one example, external air includes air outside the autonomous vehicle. The external environment 404 outside air temperature can be accessed by opening a window of the autonomous vehicle.

In some implementations, the thermal management system 420 sends instructions that cause cooling from another source to be transferred to the delivery container 412. In one example, the thermal management system 420 sends instructions that cause the HVAC 402 to cool the delivery container 412. In some examples, the thermal management system 420 sends instructions that cause external environment 404 air to cool the delivery container.

In some implementations, one or more of the first 410a, third 410c, and fourth 410d inputs includes a communication link. Information can be transferred to and/or from the delivery container 412 via the communication link. For instance, current temperature inside the delivery container 412 can be communicated to one or more of the HVAC system 402 and the onboard computer 406.

Figure 5:
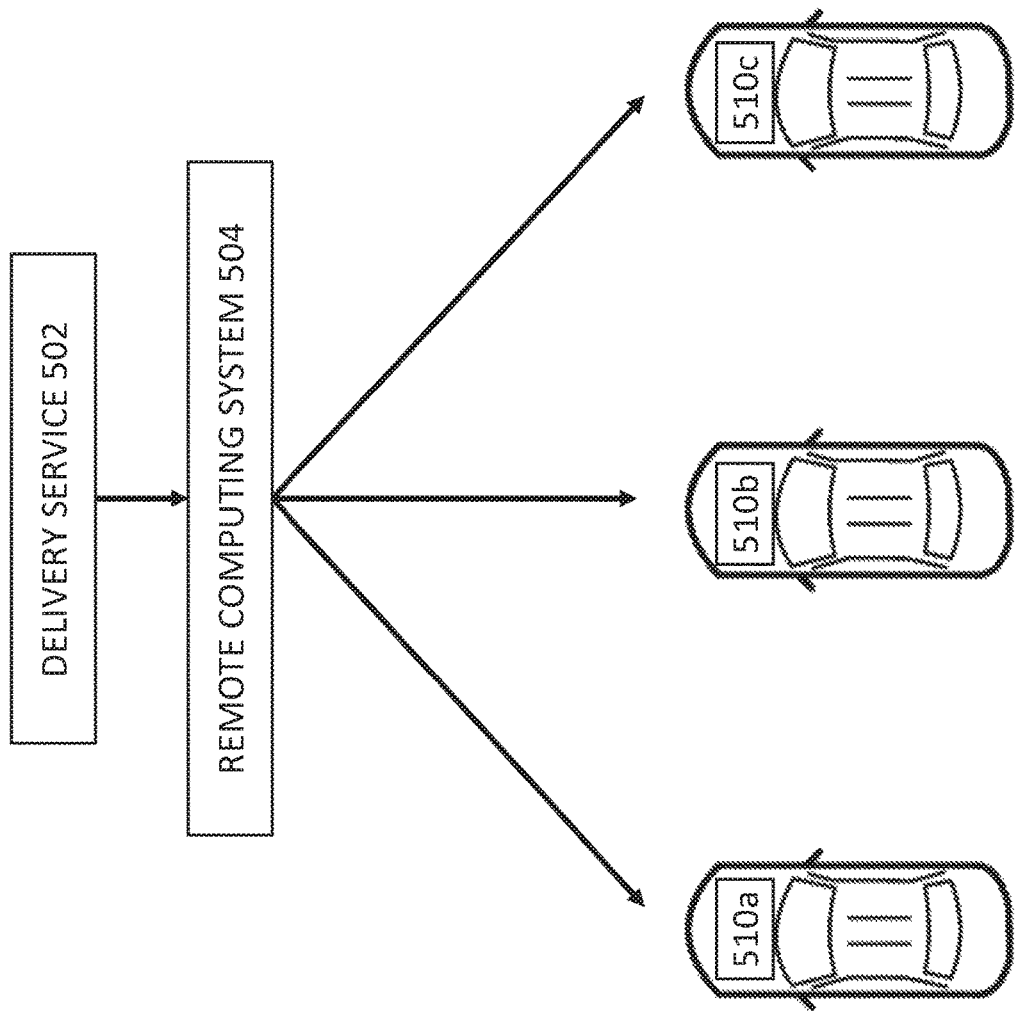
FIG. 5 is a diagram illustrating a system for package delivery, according to some embodiments of the disclosure.

FIG. 5 is a diagram illustrating a system 500 for package delivery, according to some embodiments of the disclosure. The system 500 includes a delivery service module 502, remote computing system 504, and an autonomous vehicle internal computing system 510a, 510b, 501c. The delivery service module 502 communicates a package delivery request to the remote computing system 504. The package delivery request identifies characteristics about the package including a selected temperature (or a selected temperature range) for the package. In some examples, the package delivery request identifies other characteristics such as dimensions and weight of the package.

In some examples, the package delivery request is divided into multiple subparts and the package delivery request includes different characteristics for each subpart. For example, a package delivery request may be divided into a first subpart that includes a first selected temperature and a second subpart that includes a second selected temperature, where the first selected temperature is different from the second selected temperature. In one example, the package delivery request is for a food order, and the first subpart includes a request for a cold temperature, and the second subpart includes a request for a warm temperature.

The package delivery request generated by the delivery service module 502 also includes a package pick up location and a package drop-off location. The remote computing system 504 receives the package delivery request from the delivery service module 502, and coordinates the selection of an autonomous vehicle from a fleet of autonomous vehicles for pick-up and delivery of the package. In some examples, the remote computing system 504 is a central computer such as the central computer 210 in FIG. 2. The remote computing system 504 communicates with the onboard computer 510a of the selected autonomous vehicle. The remote computing system 504 sends a pick-up location to the selected autonomous vehicle onboard computer 510a.

In some implementations, the remote computing system 504 includes a routing coordinator for planning a route for the selected autonomous vehicle, and the routing coordinator determines a route for the autonomous vehicle to travel from the autonomous vehicle's current location to the pick-up location, and from the pick-up location to the drop-off location. The remote computing system 504 sends the selected route to the autonomous vehicle. According to various implementations, the selected route is periodically updated. In some implementations, the remote computing system sends route plan information such as waypoints to the autonomous vehicle's onboard computer 510a for guiding the autonomous vehicle through an itinerary. The autonomous vehicle navigates to the waypoints until it arrives at the destination (the drop-off location). In some examples, upon arrival at the drop-off location, the autonomous vehicle onboard computer 510a send an arrival message to the remote computing system 504. The remote computing system 504 sends an arrival message to the delivery service 502.

In some implementations, once the package arrives at the drop-off location, the autonomous vehicle onboard computer initiates a delivery verification system to collect evidence of delivery of the package, for example by using a camera on the autonomous vehicle to take a picture of the package at drop-off, and/or at its delivery location.

When the remote computing system 504 receives a package delivery request from a delivery service module 502, the remote computing system 504 sends the package delivery request information to the selected autonomous vehicle onboard computer 510a, including the selected temperature (or temperature range) for the package. The selected temperature for the package may be input to a thermal management system for adjusting the temperature inside the delivery container. In some examples, the package delivery request includes a request for multiple compartments in the autonomous vehicle delivery container. The request for multiple compartments includes a request for each of the multiple compartments to have a different selected temperature. In some examples, the selected temperature is a selected temperature range. In some examples, the selected temperature includes a temperature description. Temperature descriptions include "freezing", "cold", "cool", "room temperature", "warm", and "hot".

In some implementations, the remote computing system 504 continues to schedule pick up of passengers around trips to drop off packages. In this way, idle time of autonomous vehicles can be minimized since the autonomous vehicles can continue to drop off packages when not utilized for passenger transport.

In some implementations, the delivery service module 502 receives delivery service requests from one or more users. In some examples, the delivery service module 502 receives delivery service requests from food vendors. In some examples, the delivery service module 502 receives delivery service requests from individual users. In some examples, delivery service requests are input to the delivery service module 502 via a mobile device application or a website.

Figure 6:
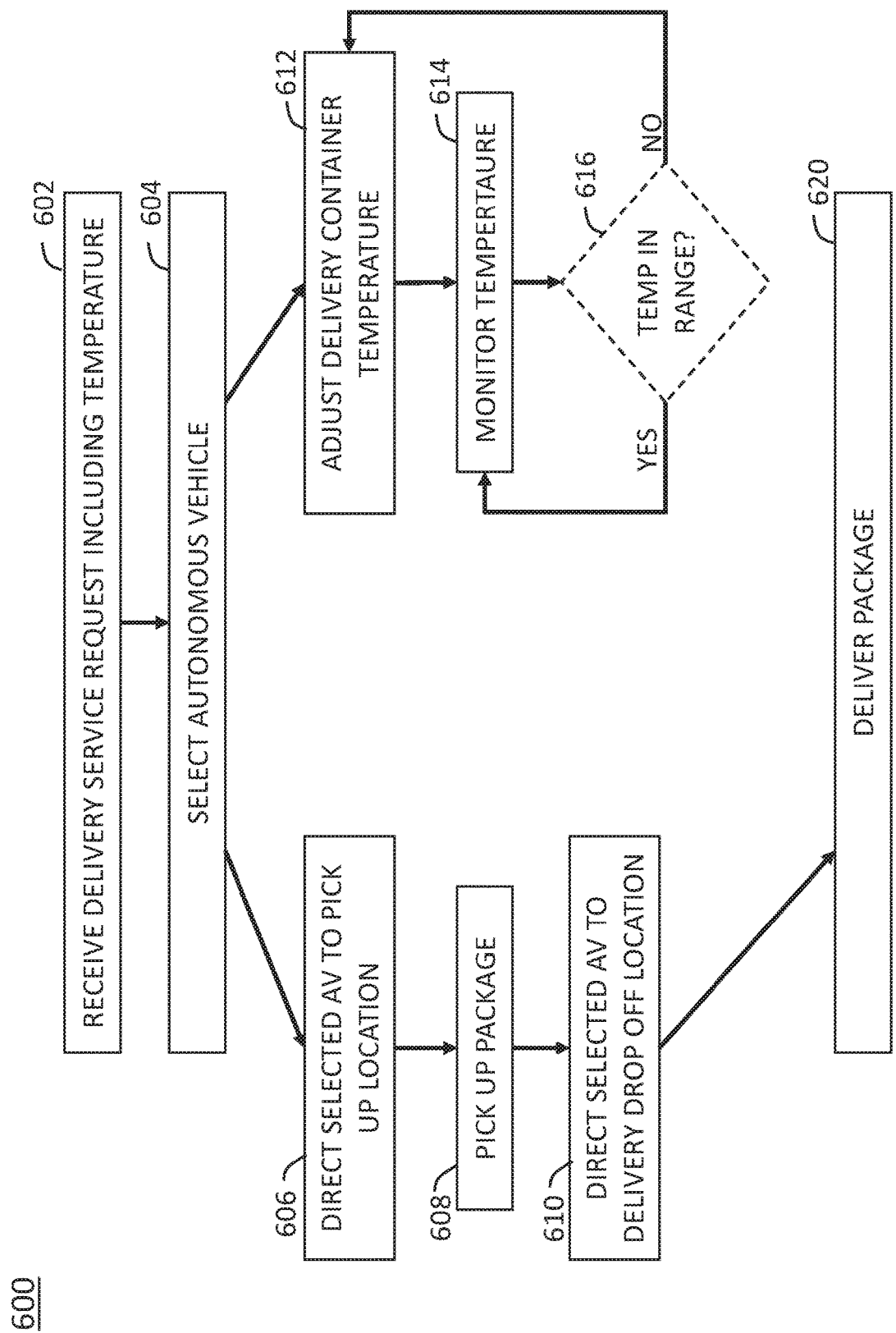
FIG. 6 is a flow chart illustrating a method of regulating temperature for autonomous vehicle delivery, according to some embodiments of the disclosure.

FIG. 6 is a flow chart illustrating a method 600 of regulating temperature for autonomous vehicle delivery, according to some embodiments of the disclosure. At step 602, a delivery service request is received. The delivery service request includes a selected temperature for storing the package to be delivered. In some instances, the package includes multiple items that are packaged separately. At step 604, an autonomous vehicle is selected for picking up and delivering the package. In various examples, the autonomous vehicle is selected by a central computer. In some examples, the autonomous vehicle is selected by a routing coordinator.

At step 606, the selected autonomous vehicle is directed to a pick-up location for the package. In some examples, a routing coordinator determines the route for the selected autonomous vehicle to travel from its current location to the pick-up location. At step 608, the autonomous vehicle picks up the package. In some examples, a user places the package in a delivery container in the autonomous vehicle. In some examples, package pick-up is automated. At step 610, the autonomous vehicle is directed to a delivery drop-off location. In some examples, a routing coordinator determines the route for the selected autonomous vehicle to travel from its the pick-up location to the drop-off location. The routing coordinator may update the route while the autonomous vehicle is traveling between the pick-up location and the drop-off location.

After an autonomous vehicle is selected for picking up and delivering the package at step 604, at step 612, the temperature of delivery container of the selected autonomous vehicle is adjusted. In particular, the delivery service request includes a selected temperature for the delivery container, and the temperature of the delivery container begins to be adjusted while the autonomous vehicle travels to the pick-up location. At step 614, the temperature of the delivery container is monitored. At step 616, it is determined whether the temperature of the delivery container is within the selected temperature range. In some examples, at step 616, it is determined whether the temperature of the delivery container is within one (or two) degrees of the selected temperature. If the temperature is within range, the temperature continues to be monitored at step 614. If the temperature is not within range, the method 600 returns to step 612, and the temperature of the delivery container is adjusted.

In some implementations, the delivery service request does not include a selected temperature, and sensors in the delivery container sense the initial temperature of the package (or goods) placed in the delivery container. The method then sets the initial temperature of the package as the selected temperature, and monitors and adjusts the temperature to maintain the initially measured temperature.

In some examples, the temperature of the delivery compartment is continuously monitored between the receipt of the pick-up location by the autonomous vehicle, and the drop-off of the package at the drop-off location. In other examples, the temperature of the delivery compartment is periodically monitored between the receipt of the pick-up location by the autonomous vehicle, and the drop-off of the package at the drop-off location.

At step 620, the package is delivered. The temperature monitoring (and adjusting) of steps 612, 614, and 616 ends when the packaged is delivered at step 620.

In various implementations, one or more sensors in the autonomous vehicle sense where the package is placed within the vehicle. In one example, a seat sensor senses on which seat the delivery is positioned. In some examples, the seat sensor can be one of a weight sensor, a pressure sensor, a light sensor, an optical sensor, or any other type of sensor. In another example, a camera detects where the package is placed.

In some examples, the location of the package in the vehicle is correlated with a nearby localized temperature sensor. Thus, in an implementation with multiple temperature sensors and/or multiple temperature-regulated compartments, a sensor determines the location of the package and the area of the vehicle for which the temperature is adjusted specifically for that particular package. In one examples, a zone of heating and/or cooling is specified based on sensor data determining the location and position of the package. The sensor data may also determine the size of the package.

Figure 7:
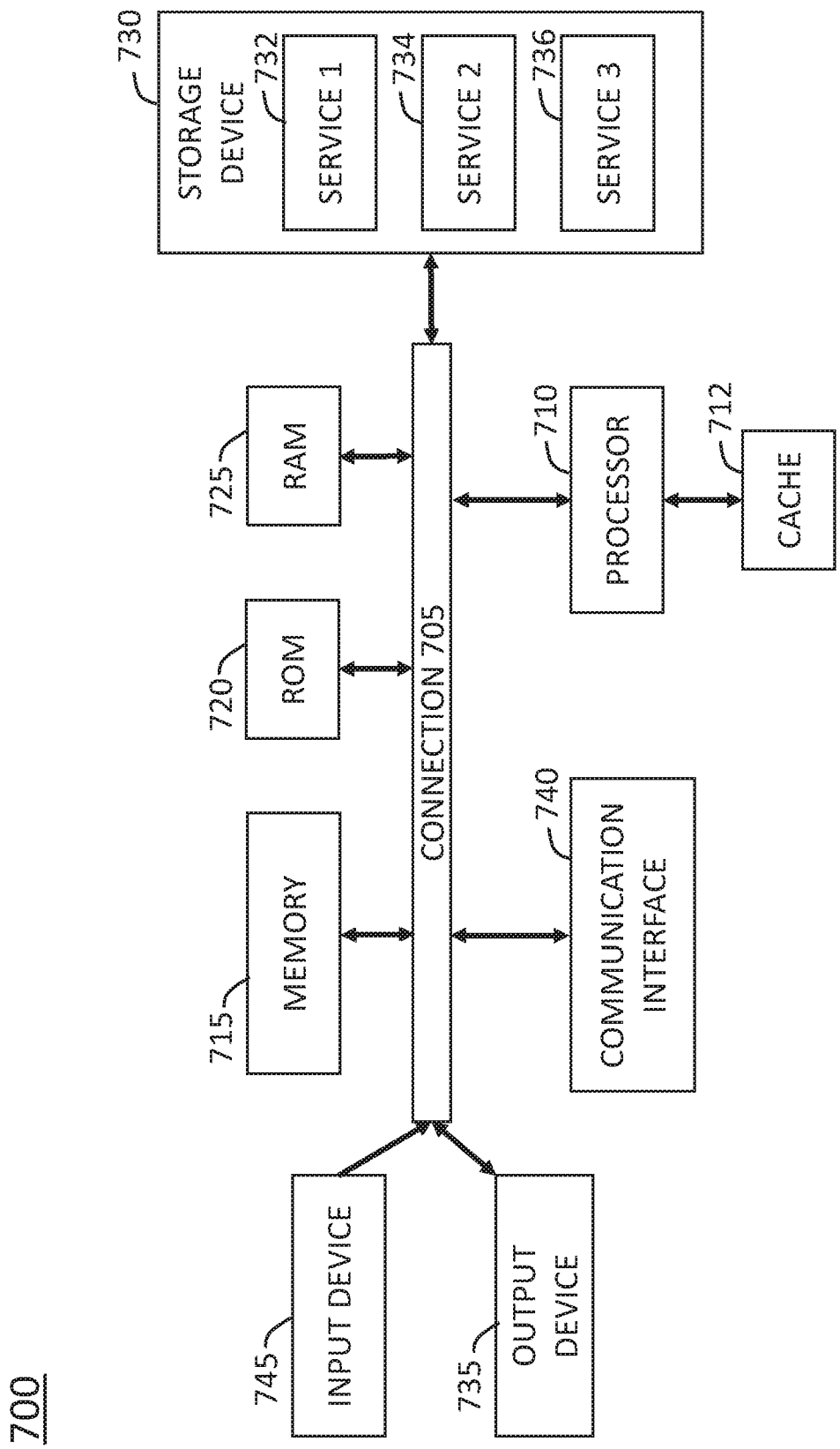
FIG. 7 shows an example embodiment of a system for implementing certain aspects of the present technology.

FIG. 7 shows an example embodiment of a computing system 700 for implementing certain aspects of the present technology. In various examples, the computing system 700 can be any computing device making up the onboard computer 104, the central computer 210, the remote computing system 504, a device executing the delivery service 502, or any other computing system described herein. The computing system 700 can include any component of a computing system described herein which the components of the system are in communication with each other using connection 705. The connection 705 can be a physical connection via a bus, or a direct connection into processor 710, such as in a chipset architecture. The connection 705 can also be a virtual connection, networked connection, or logical connection.

In some implementations, the computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

The example system 700 includes at least one processing unit (CPU or processor) 710 and a connection 705 that couples various system components including system memory 715, such as read-only memory (ROM) 720 and random access memory (RAM) 725 to processor 710. The computing system 700 can include a cache of high-speed memory 712 connected directly with, in close proximity to, or integrated as part of the processor 710.

The processor 710 can include any general-purpose processor and a hardware service or software service, such as services 732, 734, and 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction, the computing system 700 includes an input device 745, which can represent any number of input mechanisms, such as a microphone for speech, a touch-sensitive screen for gesture or graphical input, keyboard, mouse, motion input, speech, etc. The computing system 700 can also include an output device 735, which can be one or more of a number of output mechanisms known to those of skill in the art. In some instances, multimodal systems can enable a user to provide multiple types of input/output to communicate with the computing system 700. The computing system 700 can include a communications interface 740, which can generally govern and manage the user input and system output. There is no restriction on operating on any particular hardware arrangement, and therefore the basic features here may easily be substituted for improved hardware or firmware arrangements as they are developed.

A storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as a processor 710, a connection 705, an output device 735, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

In some implementations, a package delivery request is assigned a lower level of importance than a passenger ride request. In one example, a package delivery request for same day delivery of goods which has a wide delivery time window is assigned a lower level of importance than a passenger ride request. In some implementations, a package delivery request is assigned the same level of importance as a passenger ride request. In some implementations, a package delivery request is assigned a higher level of importance than a passenger ride request. In one example, a package delivery request is for quick delivery of freshly prepared food and is assigned a high level of importance. In another example, a package delivery request is for delivery of biological materials. Similarly, a package delivery request for delivery of biological materials is assigned a high level of importance.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be/active only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 provides a method for regulating temperature in for autonomous vehicle delivery including receiving a delivery request including a selected temperature, selecting an autonomous vehicle to fulfill the delivery request, wherein the autonomous vehicle has a delivery container, directing the selected autonomous vehicle to a pick-up location, adjusting a delivery container temperature to correspond to the selected temperature, and transporting a package in the delivery container to a drop off location.

Example 2 provides a method according to example 1, further comprising monitoring the delivery container temperature. In some examples, a thermal management system monitors the delivery container temperature.

Example 3 provides a method according to examples 1-2, wherein monitoring the delivery container temperature includes one of continuously monitoring the delivery container temperature and periodically monitoring the delivery container temperature.

Example 4 provides a method according to examples 1-3, further including determining whether the delivery container temperature corresponds to the selected temperature and outputting a determination.

Example 5 provides a method according to one or more preceding examples, where adjusting a delivery container temperature is based at least in part on the determination.

Example 6 provides a method according to one or more preceding examples, where the selected temperature includes a temperature range.

Example 7 provides a method according to one or more preceding examples, where adjusting the delivery container temperature includes one of heating the delivery container and cooling the delivery container.

Example 8 provides a method according to one or more preceding examples, where adjusting the delivery container temperature includes receiving an input from an HVAC system.

Example 9 provides a method according to one or more preceding examples, where adjusting the delivery container temperature includes increasing the delivery container temperature by utilizing heat generated by at least one of an onboard computer and a battery.

Example 10 provides a method according to one or more preceding examples, where adjusting the delivery container temperature includes utilizing an external environment temperature and inputting the external environment temperature to the delivery container.

Example 11 provides a method according to one or more preceding examples, where the external environment includes air inside the autonomous vehicle.

Example 12 provides a method according to one or more preceding examples, where external environment includes air outside the autonomous vehicle.

Example 13 provides a method according to one or more preceding examples, where the delivery container includes a first compartment and a second compartment, and where adjusting the delivery container temperature includes: adjusting a first temperature of the first compartment, and adjusting a second temperature of the second compartment.

Example 14 provides a method according to one or more preceding examples, where the first temperature is different from the second temperature.

Example 15 provides a system for autonomous vehicle delivery, including a plurality of autonomous vehicles each having a respective delivery container and a remote computing system. The remote computing system is configured to receive a package delivery request including a selected temperature, select an autonomous vehicle from the plurality of autonomous vehicles to fulfill the package delivery request, and direct the selected autonomous vehicle to a pick-up location. Each of the plurality of autonomous vehicles is configured to adjust a delivery container temperature of the respective delivery container to correspond to the selected temperature, and transport a package in the respective delivery container to a drop off location Example 16 provides a system according to one or more preceding examples, where the respective delivery container includes a first compartment and a second compartment, and wherein each of the plurality of autonomous vehicles is configured to adjust the delivery container temperature by adjusting a first temperature of the first compartment, and adjusting a second temperature of the second compartment.

Example 17 provides a system according to one or more preceding examples, where each of the plurality of autonomous vehicles includes a thermal management system, and wherein the thermal management system adjusts the delivery container temperature.

Example 18 provides a system according to one or more preceding examples, where the thermal management system uses thermal energy from one of a battery, an onboard computer, and an external environment to adjust the delivery container temperature.

Example 19 provides a vehicle for delivering packages including a delivery container, wherein an inside of the delivery container is temperature regulated, a processor for receiving a routing instruction including a selected temperature for the delivery container and monitoring a delivery container temperature, and a thermal management system for adjusting the delivery container temperature.

Example 20 provides a vehicle according to one or more preceding examples, where the thermal management system further manages a battery temperature and an onboard computer temperature.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes).

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for regulating temperature for autonomous vehicle delivery, comprising:

receiving a delivery request including a selected temperature;

selecting an autonomous vehicle to fulfill the delivery request, wherein the autonomous vehicle has a delivery container;

directing the selected autonomous vehicle to a pick-up location;

measuring a delivery container temperature at a thermal management system;

determining, at the thermal management system, external temperatures external to the delivery container, including:

determining an onboard computer compartment temperature of an onboard computer compartment, determining a battery compartment temperature of a battery compartment, determining a surrounding environment air temperature, wherein a surrounding environment is an area adjacent to an exterior of the delivery container inside the autonomous vehicle, and determining an outside air temperature, wherein outside air is exterior to the autonomous vehicle; and adjusting, by the thermal management system, the delivery container temperature to correspond to the selected temperature, wherein adjusting the delivery container temperature includes using at least one of heat from the onboard computer compartment, heat from the battery compartment, air from the surrounding environment, and outside air; and transporting a package in the delivery container to a drop off location.

2. The method of claim 1, further comprising determining whether the delivery container temperature corresponds to the selected temperature and outputting a determination.

3. The method of claim 2, wherein adjusting a delivery container temperature is based at least in part on the determination.

4. The method of claim 1, wherein the selected temperature includes a temperature range.

5. The method of claim 1, wherein adjusting the delivery container temperature includes receiving an input from an HVAC system.

6. The method of claim 1, wherein using the heat from the onboard computer compartment includes utilizing heat generated by the onboard computer and wherein using the heat from the battery compartment includes utilizing heat generated by the battery.

7. The method of claim 6, wherein utilizing heat generated by the onboard computer comprises transferring the heat to the delivery container through one of an input line and thermal conduction.

8. The method of claim 6, wherein utilizing heat generated by the battery comprises transferring the heat to the delivery container through one of an input line and thermal conduction.

9. The method of claim 1, wherein adjusting the delivery container temperature comprises inputting air through an input line to the delivery container, wherein the input line connects the delivery container with at least one of the onboard computer compartment, the battery compartment, the air from the surrounding environment, and the outside air.

10. The method of claim 1, wherein the delivery container includes a first compartment and a second compartment, and wherein adjusting the delivery container temperature further comprises:

adjusting a first temperature of the first compartment, and adjusting a second temperature of the second compartment.

11. The method of claim 10, wherein the first temperature is different from the second temperature.

12. A system for autonomous vehicle delivery, comprising:

a plurality of autonomous vehicles each having a respective delivery container; and a remote computing system configured to:
receive a package delivery request including a selected temperature,
select an autonomous vehicle from the plurality of autonomous vehicles to fulfill the package delivery request, and
direct the selected autonomous vehicle to a pick-up location;

wherein each of the plurality of autonomous vehicles is configured to:
measure a delivery container temperature of the respective delivery container;
determine external temperatures external to the respective delivery container, including:
determine an onboard computer compartment temperature of an onboard computer compartment,
determine a battery compartment temperature of a battery compartment,
determine a surrounding environment air temperature, wherein a surrounding environment is an area adjacent to an exterior of the respective delivery container inside the respective autonomous vehicle,
determine an outside air temperature, wherein outside air is exterior to the respective autonomous vehicle; and
adjust a delivery container temperature of the respective delivery container to correspond to the selected temperature, including using at least one of thermal energy from the onboard computer compartment, thermal energy from the battery compartment, air from the surrounding environment, and outside air; and
transport a package in the respective delivery container to a drop off location.

13. The system of claim 12, wherein the respective delivery container includes a first compartment and a second compartment, and wherein each of the plurality of autonomous vehicles is configured to adjust the delivery container temperature of the respective delivery container by adjusting a first temperature of the first compartment, and adjusting a second temperature of the second compartment.

14. The system of claim 12, wherein each of the plurality of autonomous vehicles includes a thermal management system, and wherein the thermal management system adjusts the delivery container temperature.

15. The system of claim 14, wherein the thermal management system uses thermal energy from one of a battery in the battery compartment, an onboard computer in the onboard computer compartment, and air from the surrounding environment, and outside air to adjust the delivery container temperature.

16. The system of claim 12, wherein each of the plurality of autonomous vehicle is configured to adjust the delivery container temperature by inputting air through an input line to the delivery container, wherein the input line connects the delivery container with one of the onboard computer compartment, the battery compartment, and the external environment.

17. A vehicle for delivering packages, comprising:
a delivery container, wherein an inside of the delivery container is temperature regulated;
a processor for receiving a routing instruction including a selected temperature for the delivery container and monitoring a delivery container temperature; and
a thermal management system for adjusting the delivery container temperature, wherein the thermal management system is configured to:
  determine an onboard computer compartment temperature of an onboard computer compartment,
  determine a battery compartment temperature of a battery compartment,
  determine a surrounding environment air temperature, wherein a surrounding environment is an area adjacent to an exterior of the delivery container inside the autonomous vehicle,
  determine an outside air temperature, wherein outside air is exterior to the autonomous vehicle, and
  adjust the delivery container temperature to correspond to the selected temperature by using at least one of heat from the onboard computer compartment, heat from the battery compartment, air from the surrounding environment, and outside air.

18. The vehicle of claim 17, wherein the thermal management system further manages a battery temperature and an onboard computer temperature.

19. The vehicle of claim 17, wherein the thermal management system is further configured to determine whether the delivery container temperature corresponds to the selected temperature and output a determination.

20. The vehicle of claim 17, wherein the thermal management system is configured to adjust the delivery container temperature by inputting air through an input line to the delivery container, wherein the input line connects the delivery container with at least one of one of: the onboard computer compartment, the battery compartment, the air from the surrounding environment, and the outside air.

* * * * *